(12) United States Patent
Fuhrmann et al.

(10) Patent No.: US 10,606,063 B2
(45) Date of Patent: Mar. 31, 2020

(54) REVERSING SYSTEM FOR TELESCOPIC SIGHTS, AND TELESCOPIC SIGHT HAVING SUCH A REVERSING SYSTEM

(71) Applicant: Schmidt & Bender GmbH & Co. KG, Biebertal (DE)

(72) Inventors: Lothar Fuhrmann, Bischoffen (DE); Jonas Joachim Höller, Lich (DE); Hartmut Deusing, Arnsberg-Holzen (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 0 days.

(21) Appl. No.: 15/864,035

(22) Filed: Jan. 8, 2018

(65) Prior Publication Data

US 2018/0203222 A1 Jul. 19, 2018

(30) Foreign Application Priority Data

Jan. 13, 2017 (DE) ......................... 10 2017 100 652

(51) Int. Cl.
  *G02B 23/14* (2006.01)
  *G02B 7/02* (2006.01)
  *F41G 1/38* (2006.01)

(52) U.S. Cl.
  CPC .............. *G02B 23/14* (2013.01); *F41G 1/38* (2013.01); *G02B 7/023* (2013.01); *G02B 7/028* (2013.01)

(58) Field of Classification Search
  CPC ...... G02B 23/14; G02B 23/00; G02B 23/145; G02B 7/10; G02B 15/14; F41G 1/38
  See application file for complete search history.

(56) References Cited

U.S. PATENT DOCUMENTS

| 3,161,716 | A | * | 12/1964 | Burris | ................. | G02B 23/145 |
| | | | | | | 356/247 |
| 3,918,852 | A | * | 11/1975 | Carter | ...................... | F04D 7/06 |
| | | | | | | 415/143 |
| 4,789,231 | A | * | 12/1988 | Shimizu | ................... | F41G 1/38 |
| | | | | | | 359/422 |
| 5,764,410 | A | * | 6/1998 | Jibiki | ...................... | G02B 7/10 |
| | | | | | | 359/422 |

(Continued)

FOREIGN PATENT DOCUMENTS

| AT | | 518376 T | * | 8/2011 | .......... | H04Q 3/0025 |
| DE | 10 2011 000 404 | | | 8/2012 | | |
| EP | | 2482023 A2 | * | 8/2012 | .............. | F41G 1/38 |

*Primary Examiner* — Benjamin P Lee
(74) *Attorney, Agent, or Firm* — Clark & Brody

(57) ABSTRACT

A reversing system for telescopic sights has a guide sleeve, an outer sleeve and a mount with an optical element, the outer sleeve being axially fixed and rotatable on the guide sleeve, and an inner cam slot in the guide sleeve, and an outer cam slot in the outer sleeve. The mount is axially displaceable in the guide sleeve and has a guide pin that projects into the inner cam slot and the outer cam slot, the guide pin having a carrier shaft with a first pivot bearing and a second pivot bearing seated thereon. The first pivot bearing is guided within the outer cam slot, and the second pivot bearing is guided within the inner cam slot. The first pivot bearing and/or the second pivot bearing have an inner ring that sits on the carrier shaft and an outer ring that is rotatably supported on the inner ring.

14 Claims, 4 Drawing Sheets

(56) References Cited

U.S. PATENT DOCUMENTS

Figure 1:
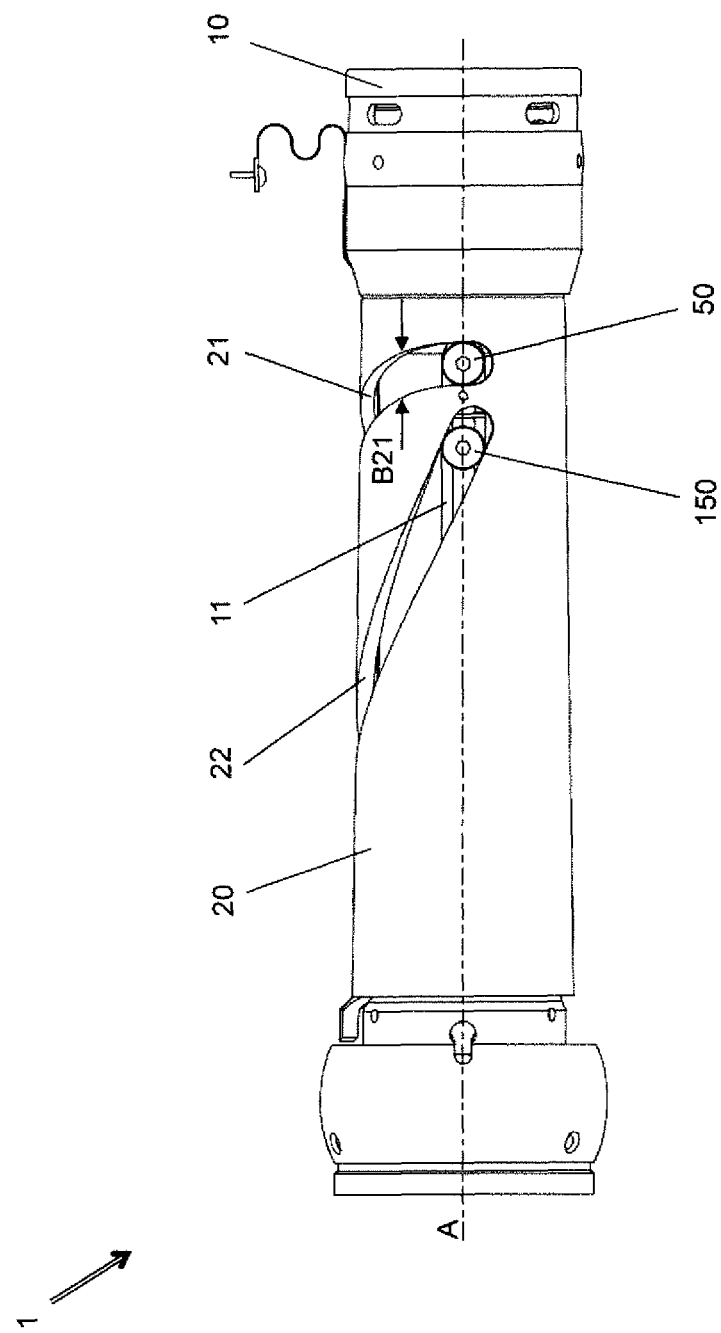

| | | | | | |
|---|---|---|---|---|---|
| 6,008,958 | A | * | 12/1999 | Ishikawa | G02B 7/08 |
| | | | | | 359/626 |
| 6,449,108 | B1 | * | 9/2002 | Bell | G02B 23/14 |
| | | | | | 359/425 |
| 6,507,705 | B1 | * | 1/2003 | Kasha | G02B 7/10 |
| | | | | | 359/822 |
| 6,816,305 | B2 | * | 11/2004 | Regan | F41G 1/38 |
| | | | | | 359/399 |
| 7,684,114 | B2 | * | 3/2010 | Thomas | F41G 1/38 |
| | | | | | 359/421 |
| 8,699,149 | B2 | * | 4/2014 | Hasselbach | G02B 7/10 |
| | | | | | 359/399 |
| 8,786,947 | B2 | * | 7/2014 | Fiedler | G02B 23/145 |
| | | | | | 359/422 |
| 2007/0217037 | A1 | * | 9/2007 | Schwab | G02B 7/10 |
| | | | | | 359/822 |
| 2011/0239516 | A1 | * | 10/2011 | Schmitt | F41G 1/38 |
| | | | | | 42/119 |
| 2012/0198749 | A1 | * | 8/2012 | Hasselbach | F41G 1/38 |
| | | | | | 42/124 |
| 2017/0255000 | A1 | * | 9/2017 | Ottl | G02B 15/14 |

* cited by examiner

REVERSING SYSTEM FOR TELESCOPIC SIGHTS, AND TELESCOPIC SIGHT HAVING SUCH A REVERSING SYSTEM

The invention relates to a reversing system for telescopic sights, according to the preamble of claim 1, and to a telescopic sight having such a reversing system, as claimed in claim 14.

Telescopic sights are used in hunting and for military purposes to aim weapons at distant targets. For that purpose they have a lens arrangement, within a housing, that magnifies a target object. As a result, however, the viewing angle is greatly limited, and it may be difficult to aim at targets that are relatively close. To make it possible to take aim at these latter targets also, the prior art offers variable magnification (zoom). Moreover, the image of the sighted target is laterally inverted in the objective plane and is upside down, and must therefore be corrected.

Technical implementation of this correction is effected by using a reversing system within the telescopic sight. The term reversing system is used in the rest of the application, and is synonymous with the designation reversing device. The reversing system allows axial displacement of at least one optical element within the reversing system, but as a rule also allows independent, or defined, displacement of two optical elements. The optical elements in this case include, inter alia, lenses, cemented lenses and reticles. This causes the image to be righted and reproduced in the ocular plane in which it is viewed. In present-day telescopic sights, the reticle is provided in the objective plane or ocular plane, and the reversing system is disposed in an inner tube of the telescopic sight.

Such a reversing system is generally composed of an inner guide sleeve having an inner cam slot, in particular a linear cam slot, and of an external sleeve having a first outer cam slot, and optionally a second outer cam slot, the outer sleeve being supported in an axially fixed and rotatable manner on the inner sleeve. The two outer cam slots each describe a curved path. Furthermore, a first and a second mount, each having a lens, are supported in a displaceable manner in the guide sleeve. In this case, a first guide pin is connected to the first mount and is disposed, at least partly, within the linear cam slot and the first outer cam slot. In like manner, a second guide pin is connected to the second mount and disposed, at least partly, within the linear cam slot and the second outer cam slot. The spacings between the lenses of the optical reversing system and the objective plane of the telescopic sight can then be varied. As a result, the magnification can be altered and the image is not upside down.

It is critical in this case that the lenses be disposed very accurately at the intended positions, so that a sharp image can be produced for the marksman. Positional deviations of even $10^{-5}$ are detrimental to the image quality and result in parallax errors. In other words, the target mark and the actual projectile impact point deviate from each other. For this reason, all movable parts must be designed with very narrow tolerances, and they must have virtually no clearance in relation to each other. Frequently, it is even the case that an over-size is selected in order to preclude clearance. This results in the reversing system being difficult to adjust. The contact regions between the guide pins and cam slots are especially critical.

Metal screws, inter alia, are known in the prior art for the purpose of engaging the guide pins in the cam slots. The outer sleeve having the curved-path cam slots is likewise composed of metal. In the case of such a combination of a metal screw and a metal outer sleeve, there is a certain intrinsic clearance, as a result of which the metal screw can be displaced in the curved path. However, such an intrinsic clearance has the disadvantage that the reversing lenses are not aligned in a defined manner, and this may cause a parallax deviation. If the clearance is reduced to a minimum, weather-related thermal fluctuations cause jamming, owing to the thermal expansion of the components. This not only prevents instantaneous adjustability, but also results in permanent damage if force is applied by the marksman. These problems occur especially frequently at very low temperatures, e.g. −40° C.

DE 10 2011 000 404 A1 discloses a reversing system for telescopic sights, which comprises a guide sleeve, disposed in which there is a linear cam slot, the outer sleeve, having an outer cam slot, being supported in an axially fixed and rotatable manner on the guide sleeve. Supported in an axially displaceable manner in the guide sleeve there is a mount, having an optical element and having a guide pin that passes through the linear cam slot and the outer cam slot. The guide pin has a first sleeve and a second sleeve, the two sleeves being supported on a common shaft, and the first sleeve being movable within the outer cam slot, and the second sleeve being movable within the linear cam slot. This design has the disadvantage of high frictional forces, which to an extent cause the sleeves to slide in the cam slots, in particular at very low ambient temperatures. This causes wear, resulting in decreasingly precise adjustment and, in exceptional cases, in dust particles in the lens system.

It is therefore the object of the invention to develop a reversing system that can be used, in a non-destructive and convenient manner, in a very wide spectrum of temperatures, and in particular also at very low temperatures, without incurring losses of image quality and parallax accuracy. The solution should allow simple production and installation, and should be inexpensive and achieve a long service life. Preferably, the solution should also be suitable for enabling telescopic sights to be retrofitted.

The main features of the invention are specified in the characterizing portion of claim 1 and in claim 14. Developments are disclosed in claims 2 to 13.

The invention relates to a reversing system for telescopic sights, having a guide sleeve, an outer sleeve and a mount that has an optical element, the outer sleeve being supported in an axially fixed and rotatable manner on the guide sleeve, and an inner cam slot, preferably a linear cam slot, being realized in the guide sleeve, and an outer cam slot being realized in the outer sleeve, the mount being supported in an axially displaceable manner in the guide sleeve and having a guide pin that projects into or passes through the inner cam slot and the outer cam slot, the guide pin having a carrier shaft, on which are seated a first pivot bearing and a second pivot bearing, the first pivot bearing being guided within the outer cam slot, and the second pivot bearing being guided within the inner cam slot, and the first pivot bearing and/or the second pivot bearing having, in the centre thereof, an inner ring that sits on the carrier shaft and an outer ring that is rotatably supported on the inner ring.

Owing to the provision of pivot bearings, during displacement particularly little friction is caused by the cam slots when the outer sleeve is rotated relative to the inner sleeve. Owing to the provision of two pivot bearings, the latter can rotate at differing rates, and if necessary also in opposite directions. As a result, the shearing forces acting on the pivot bearings are slight, and material damage is avoided in an effective manner. Moreover, only slight adjusting forces are needed, and the reversing device does not become jammed, even at very low temperatures. The adhesion of the pivot bearing to the contacted cam slot is greatest in the region at which the greatest force is introduced from one of the cam slots into one of the pivot bearings. When the outer sleeve is rotated relative to the guide sleeve, the pivot bearing can now roll over this region, whereas is slips over the cam slot in regions of lesser load, in particular on the opposite side.

By means of a pivot bearing having an outer ring, the latter, in particular, is guided in the inner cam slot or outer cam slot. It will then rotate on the inner ring. The inner ring and outer ring can then be supported on each other with the least possible frictional forces. The carrier shaft should be aligned transversely, preferably perpendicularly, in relation to the displacement axis of the mount. This simplifies precise and space-saving movement kinematics between the outer sleeve, the inner sleeve and the mount. In most telescopic sights, the carrier shaft is then also aligned transversely, preferably perpendicularly, in relation to the optical axis of the telescopic sight.

The outer cam slot should be a curved path. This has at least a form similar to that of a spiral, but for the most part without a constant pitch. Consequently, the advance of the mount having the optical element is not constant per unit of rotation. By means of the curved path, the adjustment behavior can thus be adapted to the optical effects of the lens, depending on the position of arrangement. A shallow gradient may be provided in sensitive positions, and a steeper gradient in less sensitive positions. Excessively steep gradients are to be avoided, however, since these may result in self-locking of the reversing system. The marksman can now comfortably use the adjustment range, and can continuously rotate an adjusting wheel provided for this purpose, without the magnification being altered at a different rate, or abruptly.

As optical elements, lenses, cemented lenses or reticles, inter alia, may be disposed in the mount.

According to a more particular development, the first and the second pivot bearing are clamped-in, preferably in a rotationally fixed manner, in the or their centre, between a stop of the carrier shaft and the mount. Rotational fixedness is desirable only in the case of normal operational movement forces of the reversing system, but not absolute rotational fixedness.

The stop is preferably disposed at a first end of the carrier shaft. The support shaft can thus be of a short design, without projecting far out of the outer cam slot. In a special embodiment, a tool opening for a rotary tool is realized in the carrier shaft, at the first end. The guide pin can thereby be easily mounted on the mount. Preferably, the tool opening is a hexagonal opening. Such an opening allows ease of mounting. Also possible, however, are alternative tool openings for other rotary tools, such as slot screwdrivers, crosshead screwdrivers or Torx screwdrivers. Furthermore, the tool opening preferably projects into a region that is radially inside the first pivot bearing. Consequently, a particularly short guide pin is achieved, which does not project far out of the outer cam slot.

In the case of a special embodiment, the stop is realized by a top shoulder realized from the carrier shaft. This allows a stable, compact design of the carrier shaft, which may be similar to a screw. In particular, the top shoulder may be realized in the form of a disk. It is then particularly flat and compact.

An optional feature consists in that the carrier shaft realizes a cover plate, in particular at its first end, the cover plate being disposed at a distance apart from the first pivot bearing. The first pivot bearing is thereby protected. For this purpose, the cover plate spans at least $2/3$, preferably at least $3/4$, and particularly preferably at least $4/5$ of the end face of the first pivot bearing. The end face is to be viewed, in particular, from an axial direction of the carrier shaft. A possibility is an embodiment in which the cover plate has a circular circumference. The optional designs may result in a design in which the stop and the cover plate are part of the top shoulder at the first end of the carrier shaft. Preferably, the top shoulder is composed of the stop and the cover plate.

For the reversing system to be of a design that is as compact as possible, the top shoulder should project into the outer cam slot, in particular at least slightly. To enable the first pivot bearing to be guided in an effective manner in the outer cam slot, it is useful for the top shoulder to project out of the outer cam slot. It is particularly to be preferred if the top shoulder projects at least $2/3$ out of the outer cam slot. Additionally, it is to be preferred if the length of the top shoulder is less than the width of the first pivot bearing, in particular in the axial direction of the carrier shaft.

In the case of a special embodiment, the outer diameter of the cover plate is less than the outer diameter of the first pivot bearing. This allows the cover plate to go into the outer cam slot, without them colliding with each other.

A simple, compact design can optionally be achieved if the outer diameter of the first pivot bearing corresponds to the outer diameter of the second pivot bearing.

An inexpensive basic shape of the carrier shaft is achieved if the inner diameter of the first pivot bearing corresponds to the inner diameter of the second pivot bearing. This advantage is also achieved by a development in which the first and the second pivot bearing are seated on a common cylindrical surface of the carrier shaft.

According to an optional embodiment, at a second end the carrier shaft has a thread, preferably an external thread, that is screw-connected to a counter-thread, preferably an internal thread, on the mount. The guide pin can thereby be permanently fixedly connected to the mount, but can also be demounted again for servicing. Particularly preferably, the clamping of the first and second pivot bearing is effected by the screwed connection of the thread to the counter-thread. A defined tightening torque may be provided for this purpose. A fixed, precise connection is then achieved.

According to a particular design, the first and/or second pivot bearing is/are a rolling bearing, preferably a ball bearing or cylindrical roller bearing. With such a bearing, a particularly low friction is achieved, and the reversing system can be adjusted smoothly and with precision. In the case of a rolling bearing, rolling bodies, in particular balls or rollers, preferably balls or cylindrical rollers, are disposed between the inner ring and the outer ring.

It is furthermore provided in a special embodiment that the outer ring or outer rings is/are supported, in the axial direction of the carrier shaft, at a distance apart from adjacent components. The outer rings are consequently exposed at their end faces, and have no friction there. They thus rotate very smoothly on the inner ring or rings.

A preferred embodiment is that in which the first and the second pivot bearing do not engage in each other along the carrier shaft, or do not overlap/intersect along the carrier shaft. This makes it possible, for example, for inexpensive standard rolling bearings to be used as pivot bearings.

Also suitable is a dimensioning in which the first pivot bearing is narrower than the outer cam slot. As a result, along the carrier shaft, space is kept clear next to the pivot bearing for air gaps or further components.

It is additionally to be preferred if the second pivot bearing is designed so as to be narrower than the inner cam slot. This likewise creates space, along the carrier shaft, next to the pivot bearing for air gaps or further components.

Space, and in addition low friction, can furthermore be achieved by a dimensioning according to which an annular air gap is realized between the inner sleeve and the outer sleeve, over the length of the inner cam slot. The air gap is preferably narrower than the inner cam slot, or than the width of the second pivot bearing. The reversing system therefore remains compact. The inner and the outer sleeve are preferably rotatably supported on each other in front of and behind the inner cam slot. Consequently, during rotation, there is little friction between the inner and the outer sleeve.

Preferably, the outer diameter of the first pivot bearing is less than the width of the outer cam slot, in such a manner that there is a clearance fit, in particular a clearance fit with very little clearance. Also to be preferred is a dimensioning in which the outer diameter of the second pivot bearing is less than the width of the inner cam slot, in such a manner that there is a clearance fit, in particular a clearance fit with very little clearance. As a result, respectively, precise guiding of the mount and a high image quality are achieved. In addition, the respective bearing bears against only one side of the cam slot, and can roll over this contact point. The opposite side rotates freely past the surface of the cam slot. Furthermore, the pivot bearings may be seated with an interference fit, in particular a slight interference fit, on the guide pin. This enables them to be correctly positioned.

In a special development, in which the first pivot bearing and the second pivot bearing respectively have an inner ring seated on the carrier shaft and an outer ring rotatably supported on the inner ring, it is provided that the outer rings of the first and second pivot bearing do not touch. This prevents friction from occurring between the outer rings in the case of unequal rotational speeds.

In the case of a particular variant, in which the first pivot bearing and the second pivot bearing respectively have an inner ring seated on the carrier shaft and an outer ring rotatably supported on the inner ring, it is provided that a first spacer, preferably an annular spacing washer or spacing ring, is disposed between the inner rings of the first and the second pivot bearing. The outer rings can thus be fixed at a distance apart from each other.

A particular development may consist in that the first spacer has a greater spacing distance in the centre than further outward. The inner rings of the pivot bearings are therefore kept apart, and the outer, thinner, part of the first spacer projects between the pivot bearings without touching them. In order that the first spacer does not collide with the inner or outer sleeve, the outer diameter of the first spacer should be less than the greater diameter from the group composed of the outer diameter of the first pivot bearing and the outer diameter of the second pivot bearing. Moreover, it is to be preferred if the outer diameter of the first spacer is greater than the lesser diameter from the group composed of the inner diameter of the outer ring of the first pivot bearing and the inner diameter of the outer ring of the second pivot bearing. With such a dimensioning, the greater part of the end face of the larger pivot bearing can be covered.

Precise and simple installation can be achieved if the inner diameter of the first spacer corresponds substantially to the inner diameter of the first pivot bearing and/or of the second pivot bearing. The spacer can then be supported on a common circumferential surface of the carrier shaft, such as one or both of the pivot bearings.

In the case of a reversing system in which the second pivot bearing has an inner ring seated on the carrier shaft and an outer ring rotatably supported on the inner ring, an optional embodiment provides that a second spacer, preferably an annular spacing washer, a spacing ring or a spacer sleeve, is disposed between the inner ring of the second pivot bearing and the mount. Optionally, the second spacer may also be realized by a shoulder on the mount. The outer ring of the second pivot bearing can thereby be prevented from rubbing on the mount. For this purpose, the outer diameter of the second spacer should be less than the inner diameter of the outer ring of the second pivot bearing.

According to a preferred development, the first pivot bearing does not project into the inner cam slot, and the second pivot bearing does not project into the outer cam slot. This achieves the effect that the pivot bearings are disposed next to each other, and inexpensive standard pivot bearings can be used.

The pivot bearings are preferably based substantially on a steel alloy. Particularly preferably, the inner sleeves of the pivot bearings are composed of an abrasion-resistant steel alloy. The outer sleeves of the pivot bearings should preferably be of the same material, or be composed at least partly thereof.

According to a special embodiment, the outer ring of the first pivot bearing and/or the outer ring of the second pivot bearing has/have an inner bearing ring and an outer shroud ring disposed thereon. This enables the material properties of the outer sleeve to be adapted to the specific requirements. Preferably, the outer shroud ring is fixedly connected to the inner bearing ring. As a result, they are mutually stabilizing, but no relative movements are produced with friction between the bearing ring and the shroud ring. The shroud ring may, for example, be pressed onto the bearing ring, for example with a transition fit or interference fit. Alternatively, materially bonded connections or adhesive bondings are possible. Preferably, the shroud ring is thicker than the bearing ring, in particular transversely to the carrier shaft. As a result, there is space available for an elastic deformation of the shroud ring.

The inner bearing ring is preferably composed of a harder material than the outer shroud ring. In particular, a material based on iron, preferably a steel or a steel alloy, is suitable for the bearing ring. A material based on plastic, preferably of polyethylene (PE) or polyoxymethylene (POM) is suitable for the shroud ring. This allows low-wear adjustment to be effected in a quiet and comfortable, and moreover precise, manner.

In a development of the reversing system, it is provided that the second outer cam slot is realized in the outer sleeve, and a second mount, having a second optical element and having guide pin, which passes through the inner cam slot and the second outer cam slot, is supported in an axially displaceable manner in the guide sleeve, the second guide pin having a carrier shaft, on which are seated a third pivot bearing and a fourth pivot bearing, the third pivot bearing being guided within the second outer cam slot, and the fourth pivot bearing being guided within the inner cam slot, and the third pivot bearing and/or the fourth pivot bearing having, in the centre thereof, an inner ring that sits on the carrier shaft and an outer ring that is rotatably supported on the inner ring. Two mounts make it possible, in particular, to achieve greater zoom ranges, the axial displacements of the mounts being coupled to each other in a defined manner via the guides. In connection with embodiments having a second guide pin, the guide pin of the first mount is designated as a first guide pin.

The second outer cam slot in this case may also be realized as a curved path. The actuating forces that occur in the case of such an arrangement are approximately twice as great as in the case of only one movable mount. Accordingly, a reduction of the actuating forces is particularly important for preventing jamming or self-locking, this being achieved, according to the invention, by means of the guide pins having a first, second, third and fourth pivot bearing. Moreover, a reversing system having two displaceable mounts is longer, and has longer cam slots. This results in an increased thermal deformation of the reversing system in the case of temperature changes, which in the prior art result in jamming at very low temperatures. Owing to the improved guiding of the guide pins in the cam slots, this fault susceptibility is also significantly reduced.

Optionally the second guide pin, corresponding to the development variants of the first guide pin, may have the various alternative development features according to preceding and following description. The advantages that ensue from the optional designs of the second guide pin are equal, in respect of content, to those of the first guide pin, but they become especially important in the case of a development having two movable mounts having optical elements, since the positioning forces are greater, the friction is greater and it is necessary to achieve a high positional accuracy of two displaceable optical elements. Particularly preferably, the first and the second guide pin are structurally identical. An advantage of this is the low number of differing components, resulting in low costs and simple installation.

The invention additionally relates to a telescopic sight having a tubular housing, disposed in which, along an optical path, are an objective lens and a reversing system as described above and in the following. The reversing system enables the image magnification to be altered in a precise and convenient manner, even at high and low temperatures. Owing to the highly compact design of the reversing system, the housing can also be slender.

In a more particular development, supported on the housing there is an adjusting means, by means of which the outer sleeve can be rotated relative to the guide sleeve. This enables the magnification to be altered in a convenient manner.

Preferably, a reticle is disposed in the housing, along the optical path, or the telescopic sight has an overlay means for overlaying a reticle into the optical path. A target can thereby be aimed at with precision.

The invention additionally relates to a firearm having a barrel and having a telescopic sight as described above and in the following, the tubular housing being disposed next to the barrel, aligned parallel to the barrel, and directly or indirectly connected to the barrel.

Figure 2:
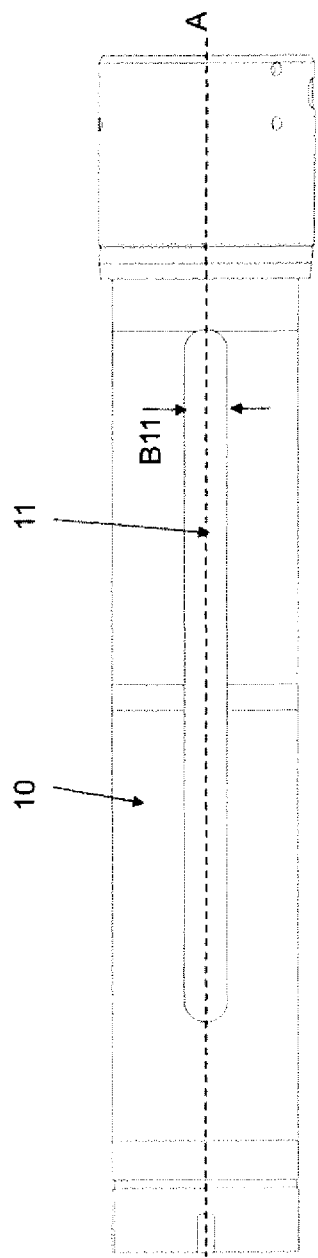
Figure 3:
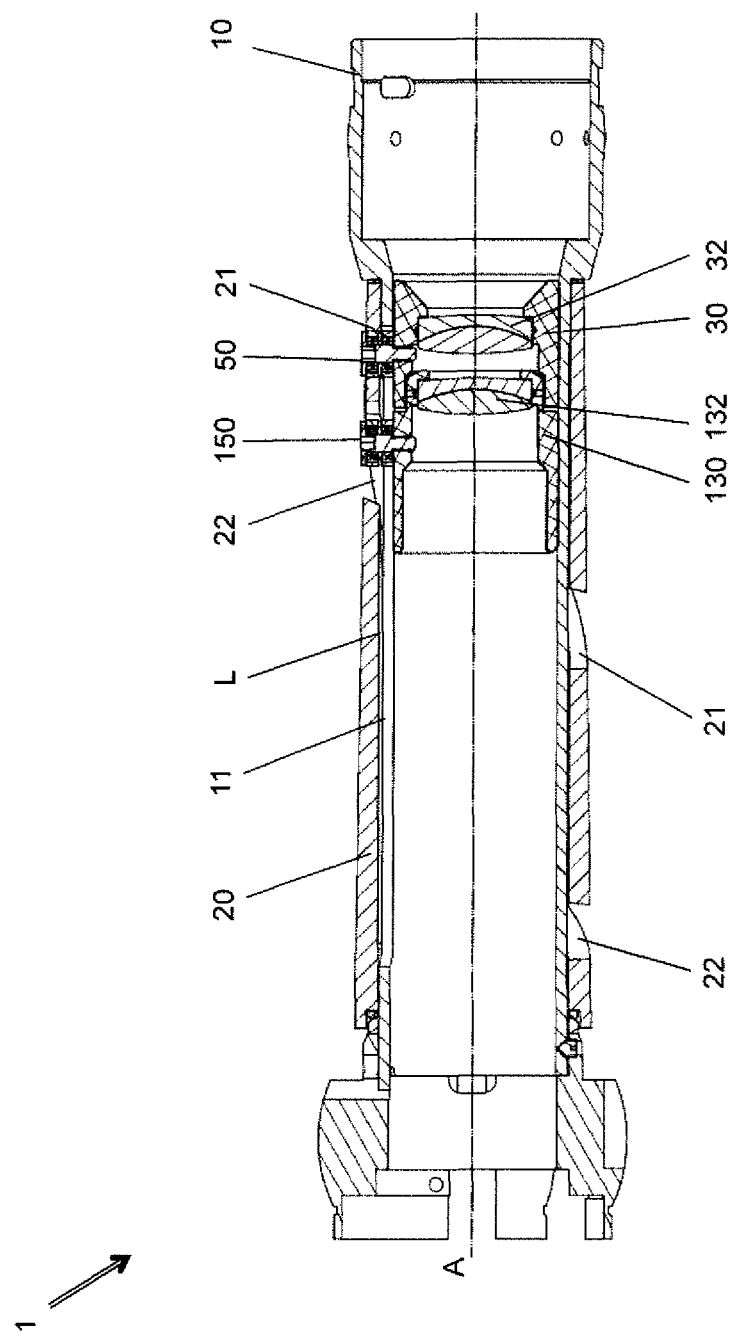

Further features, details and advantages of the invention are disclosed by the working of the claims and by the following description of the exemplary embodiments, on the basis of the drawings. There are shown:

FIG. 1 a side view of a reversing system;

FIG. 2 a guide sleeve;

FIG. 3 a longitudinal section through a reversing system; and

Figure 4:
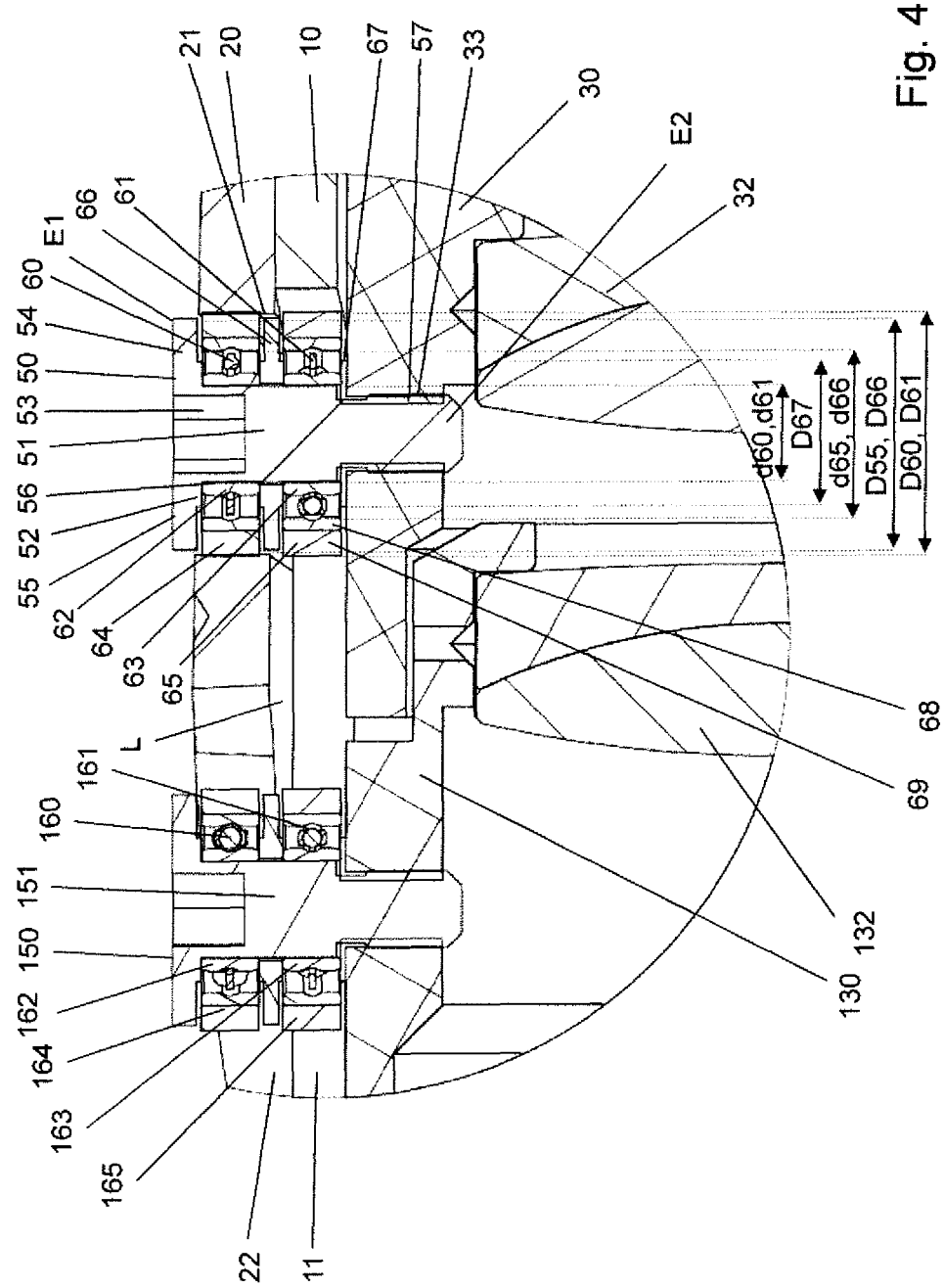

FIG. 4 a detail of the longitudinal section through the reversing system according to FIG. 3.

FIG. 1 shows a side view of a reversing system 1 for telescopic sights. It can be seen that there is a guide sleeve 10 inserted in an outer sleeve 20. The outer sleeve 20 is supported on the guide sleeve 10 in an axially fixed manner, and so as to be rotatable about an optical axis A. Realized in the guide sleeve 10 there is an inner cam slot 11, and realized in the outer sleeve 20 there is an outer cam slot 21 and a second outer cam slot 22. The outer cam slots 21, 22 are each in the form of a curved path. A first guide pin 50 of a first mount, having an optical element, projects into the inner cam slot 11 and the outer cam slot 21, so as to realize a cam mechanism. A relative rotational movement of the outer sleeve 20 on the guide sleeve 10 about the optical axis A causes a displacement of the first guide pin 50, and consequently of the inner mount, including the optical element.

At the same time, a second guide pin 150 of a second mount, having a second optical element, projects into the inner cam slot 11 and the second outer cam slot 22. The rotational motion described above then drives the second guide pin 150 through the inner cam slot 11 and the second outer cam slot 22. As a result, the second mount is displaced along the optical axis A.

Also identified in FIG. 1 is the width B21 of the outer cam slot 21.

FIG. 2 shows a side view of a guide sleeve 10, as may be used in a reversing system according to FIG. 1. It can be seen here, in particular, that the inner cam slot 11 is a linear cam slot. The latter extends parallel to the optical axis A. In addition, the linear cam slot 11 has a width B11.

Represented in FIG. 3 is a longitudinal section through the reversing system 1 according to FIG. 1. Here, in particular, it can be seen in detail how the guide sleeve 10 is inserted in the outer sleeve 20, and how the mount 30, having an optical element 32, and the second mount 130, having a second optical element 132, are supported in a longitudinally displaceable manner in the guide sleeve 10, along the optical axis A. An annular air gap L is realized between the inner sleeve 10 and the outer sleeve 20, over the length of the inner cam slot 11.

It can additionally be seen how the first and the second guide pin 50, 150 project through the linear inner cam slot 11 and the outer cam slot 21, or the second outer cam slot 22.

FIG. 4 shows, in particular, the details of the first and the second guide pin 50, 150, as this region from FIG. 3 is represented in enlarged form here.

The first guide pin 50 has a carrier shaft 51, seated on which are a first pivot bearing 60 and a second pivot bearing 61. The carrier shaft 51 is aligned transversely, namely perpendicularly, in relation to the displacement axis, or optical axis A (see FIG. 3) of the mount 30. The figure shows the first pivot bearing 60 guided within the outer cam slot 21 and the second pivot bearing 61 guided within the inner cam slot 11. The first and the second pivot bearing 60, 61 are each a rolling bearing, namely a ball bearing. In its centre, the first pivot bearing 60 has an inner ring 62 seated on the carrier shaft 51, and an outer ring 64 rotatably supported on the inner ring 62. In addition, in its centre the second pivot bearing 61 has an inner ring 63 seated on the carrier shaft 51 and an outer ring 65 rotatably supported on the inner ring 63. The rotatable support in each case is effected indirectly via rolling bodies, namely balls, between the inner ring 62, 63 and the outer ring 64, 65. As can be seen upon closer viewing, the outer ring 64 is guided in the outer cam slot 21 and the outer ring 65 is guided in the inner cam slot 11.

A first spacer 66, realized as an annular spacing washer, sits between the inner rings 62, 63 of the first and second pivot bearing 60, 61. In particular, the first and the second pivot bearing 60, 61, and the first spacer 66, sit on a common cylindrical surface 56 of the carrier shaft 51.

In addition, a second spacer 67, in the form of an annular washer, sits on the carrier shaft 51, between the inner ring 63 of the second pivot bearing 61 and the mount 30. This spacer, however, is no longer disposed on the cylindrical surface 56, but on a thinner portion of the carrier shaft 51.

A stop 52, which adjoins the cylindrical surface 56, is realized at a first end E1 of the carrier shaft 51.

The inner rings 62, 63 of the first and second pivot bearing 60, 61, and the first and the second spacer 66, 67, are clamped-in between the stop 52 of the carrier shaft 51 and the mount 30. For this purpose, at a second E2, the carrier shaft 51 has a thread 57, namely an external thread, which is screw-connected to a counter-thread 33, namely an inner thread, in the mount 30. As a result, the clamping-in of the first and second pivot bearing 60, 61 is effected by the screwed connection of the thread 57 to the counter-thread 33, in particular also because the cylindrical surface 56 is (slightly) shorter than the set composed of the pivot bearings 60, 61 and the first spacer 66 is wide. Beyond a minimum torque, under normal conditions of use of the reversing system, the inner rings 62, 63 of the first and second pivot bearing 60, 61, and the first and the second spacer 66, 67 are clamped-in in a rotationally fixed manner.

Owing to the spacers 66, 67 and the stop 52, the outer rings 64, 65 are supported, in the axial direction of the carrier shaft 51, at a distance apart from adjacent components. In particular, the outer rings 64, 65 of the first and second pivot bearing 60, 61 also do not touch. Furthermore, the outer diameter D67 of the second spacer 67 is less than the inner diameter d65 of the outer ring 65 of the second pivot bearing 61.

It can also be seen that the first and the second pivot bearing 60, 61 do not engage in each other along the carrier shaft 51, and do not overlap along the carrier shaft 51. The first pivot bearing 60 does not project into the inner cam slot 11, and the second pivot bearing 61 does not project into the outer cam slot 21. The first pivot bearing 60 in this case is narrower (in the axial direction of the carrier shaft 51) than the outer cam slot 21. The second pivot bearing 61 is narrower than the inner cam slot 11. The second pivot bearing 61 projects slightly out of the inner cam slot 11 and into the air gap L. The air gap L is narrower than the second pivot bearing 61.

The stop 52 is realized by a top shoulder 54 realized from the carrier shaft 51, at the first end E1. The top shoulder 54 also realizes a cover plate 55, which, owing to a small shoulder in relation to the stop 52, is disposed at a distance apart from the first pivot bearing 60. The cover plate 55 has a circular circumference, and covers a large portion of the end face of the first pivot bearing 60, the end face to be viewed, in particular, from the axial direction of the carrier shaft 51. The top shoulder 54 is in the form of a disk and projects slightly into the outer cam slot 21, but also protrudes out of the outer cam slot 21. In order that the cover plate 55 can project into the outer cam slot 21, the outer diameter D55 of the cover plate 55 is less than the outer diameter D60 of the first pivot bearing 60 and also less than the width B21 (see FIG. 1) of the outer cam slot 21.

At the first end E1 of the carrier shaft 51, in particular in the top shoulder 54, there is a tool opening 53 for a rotary tool, realized in the carrier shaft 51. The opening in this case is a hexagonal opening. The tool opening 53 projects into a region that is radially within the first pivot bearing 61.

It can additionally be seen in FIG. 4 that the outer diameter D60 of the first pivot bearing 60 corresponds to the outer diameter D61 of the second pivot bearing 61. The inner diameter d60 of the first pivot bearing 60 also corresponds to the inner diameter d61 of the second pivot bearing 61. The inner diameter d66 of the first spacer 66 corresponds substantially to the inner diameters d60, d61 of the first and second pivot bearing 60, 61. However, the inner diameter d66 of the first spacer 67 may also be slightly greater, namely have somewhat more fit clearance, than the inner diameters d60, d61 of the pivot bearings 60, 61. This enables it to be slid more easily onto the carrier shaft 51.

Closer examination reveals that the first spacer 66 has a greater spacing thickness in the centre than further outward. As a result, further outward it stands freely between the pivot bearings 60, 61. In particular, the outer diameter D66 of the first spacer 66 is less than the outer diameter D60, D61 of the first and second pivot bearing 60, 61.

Furthermore, the outer ring 64 of the first pivot bearing 60 and the outer ring 65 of the second pivot bearing 61 each have an inner bearing ring 68 and, disposed thereon, an outer shroud ring 69. These are connected to each other in a rotationally fixed manner, and are composed of different materials. As a result, a harder material can be used in the bearing ring, and the zone of contact to the cam slots 11, 21, 22 can be composed of a softer material. As a result, an interference fit can be realized without clearance.

The second guide pin 150 is realized so as to be structurally identical to the first guide pin 50. It can also be seen from FIG. 4 that there is a second outer cam slot 22 realized in the outer sleeve 20, and a second mount 130, having a second optical element 132, is disposed in an axially displaceable manner in the guide sleeve 10. The second guide pin 150 is connected to the second mount 130, and passes through the inner cam slot 11 and the second outer cam slot 22. The second guide pin 150 has a carrier shaft 151, seated on which are a third pivot bearing 160 and a fourth pivot bearing 161. The third pivot bearing 160 is guided within the second outer cam slot 22, and the fourth pivot bearing 161 is guided within the inner cam slot 11. The third pivot bearing 160 and the fourth pivot bearing 161 each have, in the centre thereof, an inner ring 162, 163 seated on the carrier shaft 151, and an outer ring 164, 165 rotatably supported on the inner ring 162, 163.

In respect of the further features of the second guide pin 150, reference is to be made to the structurally identical designs of the first guide pin 50.

The invention is not limited to one of the embodiments described above, but may be modified in a multiplicity of ways.

In particular, the first guide pin 50 and the second guide pin 150 may also differ in their design. This is because there may also be differing requirements resulting from differing steepnesses of gradient in the curved paths of the outer cam slots.

A reversing system such as that described in the figures may also be part of a telescopic sight. Such a telescopic sight generally has a tubular housing, in which an objective lens and the reversing system according to the invention may be disposed, along an optical path. An adjusting ring, which allows the outer sleeve 20 to be rotated on the guide sleeve 10, can be supported on the housing. A reticle may be disposed in the housing of a telescopic sight, along the optical path, or the telescopic sight has an overlay means for overlaying a reticle into the optical path.

Such a telescopic sight may be fixed to a firearm having a barrel. For this purpose, the tubular housing is disposed next to the barrel, aligned parallel to the barrel, and directly or indirectly connected to the barrel.

All features and advantages disclosed by the claims, the description and the drawing, including structural design details, spatial arrangements and method steps, may be essential to the invention, both per se and in a great variety of combinations.

| List of references | |
|---|---|
| 1 | reversing system |
| 10 | guide sleeve |
| 11 | linear cam slot |
| 20 | outer sleeve |
| 21 | outer cam slot |
| 22 | second outer cam slot |
| 30 | mount |
| 32 | optical element |
| 33 | counter-thread |
| 50 | (first) guide pin |
| 51 | carrier shaft |
| 52 | stop |
| 53 | tool opening |
| 54 | top shoulder |
| 55 | cover plate |
| 56 | cylindrical surface |
| 57 | thread |
| 60 | first pivot bearing |
| 61 | second pivot bearing |
| 62 | inner ring (first pivot bearing) |
| 63 | inner ring (second pivot bearing) |
| 64 | outer ring (first pivot bearing) |
| 65 | outer ring (second pivot bearing) |
| 66 | first spacer |
| 67 | second spacer |
| 68 | bearing ring |
| 69 | shroud ring |
| 130 | second mount |
| 132 | second optical element |
| 150 | second guide pin |
| 151 | carrier shaft |
| 160 | third pivot bearing |
| 161 | fourth pivot bearing |
| 162 | inner ring (third pivot bearing) |
| 163 | inner ring (fourth pivot bearing) |
| 164 | outer ring (third pivot bearing) |
| 165 | outer ring (fourth pivot bearing) |
| A | optical axis |
| B11 | width (linear cam slot) |
| B21 | width (outer cam slot) |
| D55 | outer diameter (cover plate) |
| D60 | outer diameter (first pivot bearing) |
| D61 | outer diameter (second pivot bearing) |
| d60 | inner diameter (first pivot bearing) |
| d61 | inner diameter (second pivot bearing) |
| d65 | inner diameter (outer ring of second pivot bearing) |
| D66 | outer diameter (first spacer) |
| d66 | inner diameter (first spacer) |
| D67 | outer diameter (second spacer) |
| E1 | first end (carrier shaft) |
| E2 | second end (carrier shaft) |
| L | air gap |

The invention claimed is:

1. A reversing system (1) for telescopic sights, having a guide sleeve (10), an outer sleeve (20) and a mount (30) that has an optical element (32), the outer sleeve (20) being supported in an axially fixed and rotatable manner on the guide sleeve (10), and an inner cam slot (11) being realized in the guide sleeve (10), and an outer cam slot (21) being realized in the outer sleeve (20), the mount (30) being supported in an axially displaceable manner in the guide sleeve (10) and having a guide pin (50) that projects into the inner cam slot (11) and the outer cam slot (21), wherein the guide pin (50) has a carrier shaft (51), on which are seated a first pivot bearing (60) and a second pivot bearing (61), the first pivot bearing (60) being guided within the outer cam slot (21), and the second pivot bearing (61) being guided within the inner cam slot (11),
wherein the first pivot bearing (60) and the second pivot bearing (61) each comprise an inner ring (62, 63) that sits on the carrier shaft (51) and an outer ring rotatably supported on the inner ring (62, 63), wherein between the inner rings (62, 63) of the first and second pivot bearings (60, 61) a first spacer (66) is arranged, which has a greater spacing thickness in the center than further outward such that the inner rings (62, 63) of the pivot bearings (60, 61) are spaced apart by the first spacer, while a part of the first spacer projects freely between the pivot bearings (60, 61) without touching them.

2. The reversing system (1) as claimed in claim 1, wherein the first and the second pivot bearing (60, 61 are clamped-in, in the center, between a stop (52) of the carrier shaft (51) and the mount (30).

3. The reversing system (1) as claimed in claim 2, wherein the stop (52) comprises a top shoulder (54) of the carrier shaft (51).

4. The reversing system (1) as claimed in claim 1, wherein the carrier shaft (51) includes a cover plate (55), the cover plate (55) being disposed at a distance apart from the first pivot bearing (60).

5. The reversing system (1) as claimed in claim 4, wherein the outer diameter (D55) of the cover plate (55) is less than the outer diameter (D60) of the first pivot bearing (60).

6. The reversing system (1) as claimed in claim 1, wherein the first and/or second pivot bearing (60, 61) is/are a rolling bearing.

7. The reversing system (1) as claimed in claim 1, wherein the outer ring or outer rings (64, 65) is/are supported, in the axial direction of the carrier shaft (51), at a distance apart from adjacent components.

8. The reversing system (1) as claimed in claim 1, wherein the first and the second pivot bearing (60, 61) do not engage in each other along the carrier shaft (51).

9. The reversing system (1) as claimed in claim 1, wherein the outer rings (64, 65) of the first and second pivot bearing (60, 61) do not touch.

10. The reversing system (1) as claimed in claim 1, wherein the second pivot bearing (61) has an inner ring (63) seated on the carrier shaft (51) and an outer ring (65) rotatably supported on the inner ring (63), wherein a second spacer (67) is disposed between the inner ring (63) of the second pivot bearing (61) and the mount (30).

11. The reversing system (1) as claimed in claim 1, wherein the first pivot bearing (60) does not project into the inner cam slot (11), and the second pivot bearing (61) does not project into the outer cam slot (21).

12. The reversing system (1) as claimed in claim 1, wherein the outer ring (64) of the first pivot bearing (60) and/or the outer ring (65) of the second pivot bearing (61) has/have an inner bearing ring and an outer shroud ring disposed thereon.

13. A telescopic sight having a tubular housing, disposed in which, along an optical path, are an objective lens and a reversing system (1) as claimed in claim 1.

14. A reversing system (1) for telescopic sights, having a guide sleeve (10), an outer sleeve (20) and a mount (30) that has an optical element (32), the outer sleeve (20) being supported in an axially fixed and rotatable manner on the guide sleeve (10), and an inner cam slot (11) being realized in the guide sleeve (10), and an outer cam slot (21) being realized in the outer sleeve (20), the mount (30) being supported in an axially displaceable manner in the guide sleeve (10) and having a guide pin (50) that projects into the inner cam slot (11) and the outer cam slot (21), wherein the guide pin (50) has a carrier shaft (51), on which are seated a first pivot bearing (60) and a second pivot bearing (61), the first pivot bearing (60) being guided within the outer cam slot (21), and the second pivot bearing (61) being guided within the inner cam slot (11), and the first pivot bearing (60)

and the second pivot bearing (61) respectively having, in the center thereof, an inner ring (62, 63) that sits on the carrier shaft (51) and an outer ring (64, 65) that is rotatably supported on the inner ring (62, 63), wherein the outer rings (64, 65) of the first and second pivot bearing (60, 61) do not touch, and further wherein between the inner rings (62, 63) of the first and second pivot bearings (60, 61) a first spacer (66) is arranged, which has a greater spacing thickness in the center than further outward such that the inner rings (62, 63) of the pivot bearings (60, 61) are spaced apart by the spacer, while a part of the spacer projects freely between the pivot bearings (60, 61) without touching them.

* * * * *